United States Patent [19]
Hurlocker

[11] 3,946,250
[45] Mar. 23, 1976

[54] CARRIER FREQUENCY SELECTOR

[75] Inventor: Claude Melvin Hurlocker, Raleigh, N.C.

[73] Assignee: International Telephone and Telegraph Corporation, Nutley, N.J.

[22] Filed: Mar. 4, 1974

[21] Appl. No.: 448,121

[52] U.S. Cl. .................. 307/241; 307/219; 307/254
[51] Int. Cl.² ........................................ H03K 17/00
[58] Field of Search .......... 307/204, 210, 219, 240, 307/241, 243, 254; 179/15 FD, 15 FS, 25 R; 340/146.1 BA; 235/153 AE, 153 AH

[56] References Cited
UNITED STATES PATENTS

| | | | |
|---|---|---|---|
| 3,233,121 | 2/1966 | Chou | 307/243 |
| 3,342,941 | 9/1961 | Kondo | 179/15 FD |
| 3,621,288 | 11/1971 | Brown | 307/243 |
| 3,657,562 | 4/1972 | Cottatellucci | 307/243 |

Primary Examiner—Stanley D. Miller, Jr.
Assistant Examiner—B. P. Davis
Attorney, Agent, or Firm—John T. O'Halloran; Menotti J. Lombardi, Jr.; Alfred C. Hill

[57] ABSTRACT

There is disclosed herein a redundant carrier frequency selection arrangement for an FDM communication system. The selection arrangement includes a source of $n$ pairs of carrier frequencies, where $n$ is an integer including one. Each carrier frequency of one pair of the $n$ pairs of carrier frequencies are equal and the carrier frequency of each pair of the $n$ pairs of carrier frequencies are different. $n$ plurality of FDM communication equipment requiring a carrier are coupled to the source of $n$ pairs of carrier frequencies and each plurality of the communication equipment of the $n$ plurality of communication equipment responds to a different pair of the $n$ pairs of carrier frequencies. An electronic switch is disposed in each of the $n$ plurality of communication equipment to select either one of the carrier frequencies of an associated pair of the $n$ pairs of carrier frequencies.

15 Claims, 3 Drawing Figures

CARRIER FREQUENCY SELECTOR

BACKGROUND OF THE INVENTION

This invention relates to single sideband (SSB) frequency division multiplex (FDM) equipment used for telecommunication systems and more particularly to a redundant carrier frequency selection arrangement for such FDM communication systems.

The SSB/FDM equipment is more commonly referred to as an FDM system and normally handles large numbers of voice signals (individual telephone channels), which are combined into a multichannel broadband signal for transmission over a given distance. At the receiving end the FDM equipment separates the multichannel signals back into individual voice signals.

Those portions of FDM equipment that handle more than 12 channels are constantly provided with redundant or backup equipment which automtically takes over should the normal equipment fail. One such subsystem in FDM systems is the carrier supply. The carrier supply functions to provide numerous outputs of different frequencies for use as carriers and pilot signals. These signals of different frequencies are usually all derived from a common master oscillator which may or may not be synchronized to an external frequency standard. Two such complete carrier sources are normally provided within the carrier supply system selector circuits.

In practical systems a carrier supply must be provided initially with an FDM communications system even though it is equipped with a small telephone traffic capacity. Such systems have relatively few units requiring redundancy. The units requiring redundancy are known as translators, modulators, demodulators and modems and are referred to herein as FDM communication equipment requiring a carrier or more simply as FDM equipment.

The normal lumped carrier selection arrangement of the prior art wherein the selection of one or the other of redundant carrier frequencies is accomplished at a central carrier supply arrangement has the following disadvantages:
1. When a redundant frequency switch fails, all of the FDM equipment connected to that switch are rendered inoperative;
2. The switch is costly and requires significant power since the switch must handle sufficient power to provide selected redundant carrier to all of the FDM equipments connected to that switch; and
3. The single conductor carrying the selected redundant carrier frequency from the switch to the plurality of FDM equipments is subject to being short circuited or open circuited and thereby causing outage in all the FDM equipment connected with this single redundant carrier frequency conductor.

SUMMARY OF THE INVENTION

An object of the present invention is to provide a carrier frequency selection arrangement of the redundant type which overcomes the disadvantages of the prior art arrangement.

Another object of the present invention is to provide a carrier frequency selection arrangement in each FDM equipment rather than in a centralized or lumped carrier supply unit.

A feature of the present invention is the provision of a redundant carrier frequency selection arrangement for a frequency division multiplex communication system comprising: first means to provide $n$ pairs of carrier frequencies, where $n$ is an integer including one, each carrier frequency of one pair of the $n$ pairs of carrier frequencies are equal and the carrier frequencies of each pair of the $n$ pairs of carrier frequencies are different; $n$ plurality of second means each requiring a carrier frequency coupled to said first means and each plurality of second means of the $n$ plurality of second means responding to a different pair of the $n$ pairs of carrier frequencies; and an electronic switching means disposed in each of the $n$ plurality of second means to select either one of the carrier frequencies of an associated pair of the $n$ pairs of carrier frequencies.

Another feature of the present invention is the provision of a signal selector comprising: a first input means for a first signal having a first given frequency; a second input means for a second signal having a second given frequency; an output means; and electronic switching means including a first pair of normally non-conductive transistors coupled to each other, the first input means and the output means, a second pair of normally non-conductive transistors coupled to each other, the second input means and the output means, a first bias voltage selectively coupled to the first pair of transistors to render the first pair of transistors conductive to couple the first signal to the output means, and a second bias voltage selectively coupled to the second pair of transistors to render the second pair of transistors conductive to couple the second signal to the output means.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
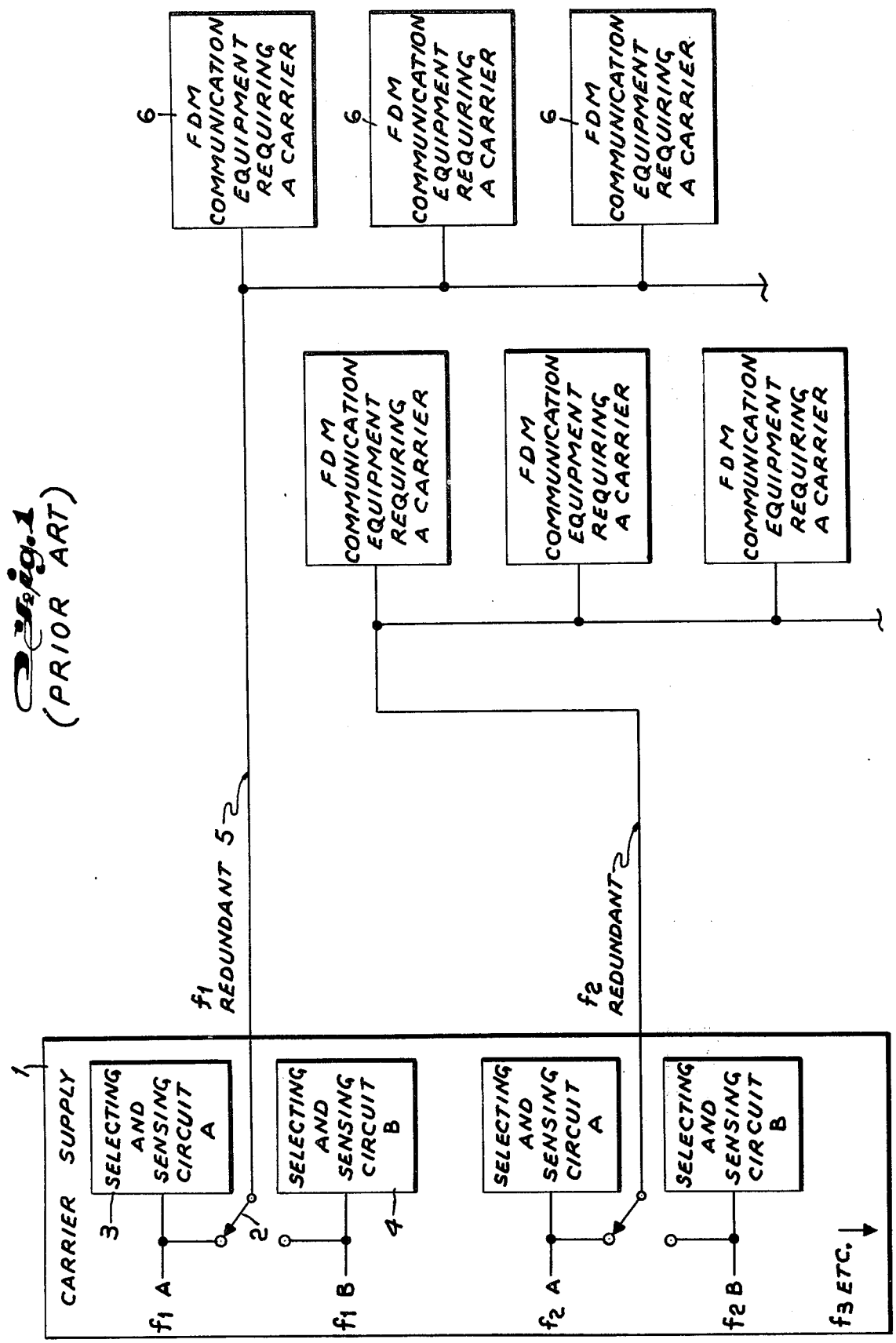
FIG. 1 is a block diagram illustrating the centralized or lumped carrier arrangement employed in the prior art.

Referring to FIG. 1, there is disclosed therein the centralized or lumped carrier supply selection arrangement to provide redundant carrier frequencies as implemented in the prior art. The centralized carrier supply 1 provides a plurality of pairs of carrier frequencies where the frequencies of each pair are the same, but the frequencies of different pairs are different. The carrier frequency of a pair of frequencies are selected to provide redundant frequencies by a switch 2 which is under control of selecting and sensing circuits 3 and 4. These circuits 3 and 4 sense the loss of one of the carrier frequencies of a pair of carrier frequencies and actuates switch 2 to select the other carrier frequencies of the pair of carrier frequencies. The selected redundant carrier frequency is then coupled over a single conductor 5 to FDM equipments 6 requiring a carrier frequency. Switch 2 is shown as a simple switch symbol, however, in practice metallic switch or relay contacts are not fast enough or reliable enough. Therefore, they are normally implemented with solid state switch components that are more reliable because there are no moving parts.

As mentioned hereinabove, the failure of switch 2 will remove all of the equipments 6 from operation. Also, switch 2 must consume more power and will be costly since this switch passes the selected carrier frequency to all of the equipments 6. Also, the single conductor 5 carrying the selected redundant carrier frequency can easily become short circuited or can become open circuited, which would also remove equipments 6 from service.

Figure 2:
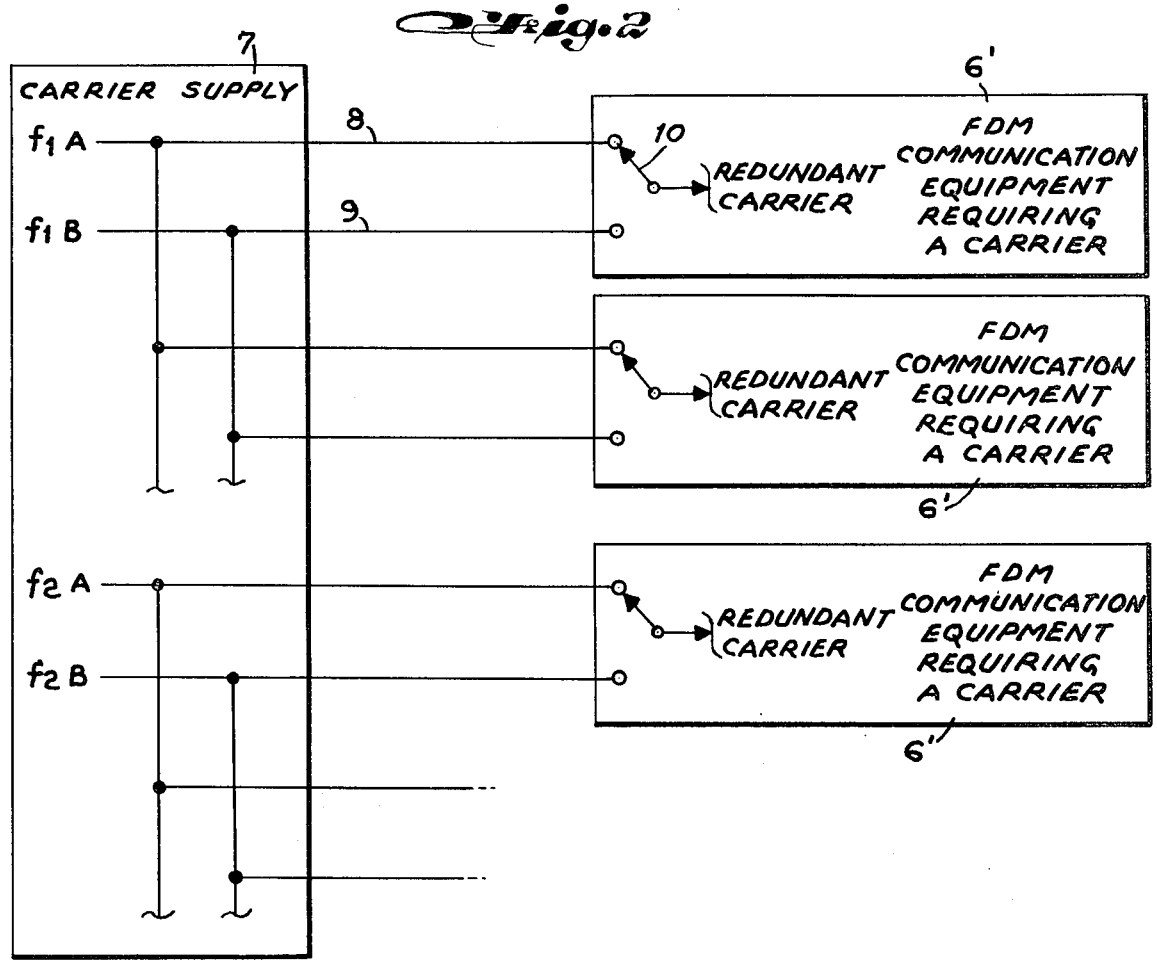
FIG. 2 is a block diagram of the distributed carrier supply selection arrangement in accordance with the principles of the present invention.

Referring to FIG. 2 there is disclosed therein a distributed redundant carrier frequency selective arrangement in accordance with the principles of the present invention. The redundant carrier frequencies are required in equipments 6'. In the arrangement of FIG. 2 carrier supply 7 transmits one of the carrier frequencies of a redundant pair of carrier frequencies over conductor 8 to equipments 6' and the other of the redundant carrier frequencies over conductor 9 to equipments 6'. Each of equipments 6' include therein switch 10, which is associated with a selecting and sensing circuit similar to circuits 3 and 4 of FIG. 1 to sense a loss of one of the redundant carrier frequencies and to actuate switch 10 to its other position so as to employ the other of the redundant carrier frequencies in each of equipments 6'. As mentioned hereinabove with respect to FIG. 1, switch 10 is shown as a simple switch symbol. However, in practice metallic switch or relay contacts are not fast enough or reliable enough. Therefore, they are normally implemented with solid state components which are more reliable because there are no moving parts. Such a solid state switch is shown in FIG. 3.

Figure 3:
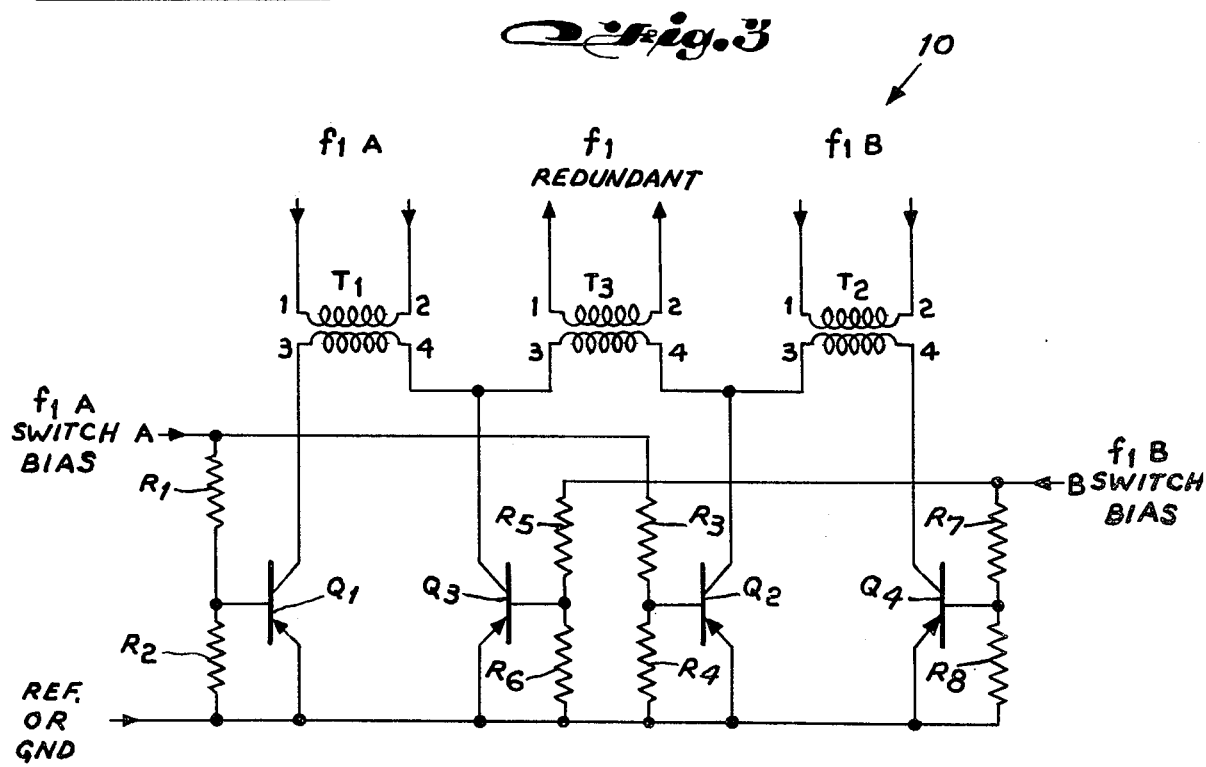
FIG. 3 is a schematic diagram of one form which the redundant carrier frequency selecting switches of FIG. 2 may take.

Referring to FIG. 3, switch 10 includes a first transformer T1 having a primary winding receiving the redundant frequency $f_1A$ which is coupled to the secondary winding of transformer T1. Transformer T2 receives on its primary winding the redundant frequencies $f_1B$ which is coupled to the secondary winding of transformer T2. One end of each of the secondary winding of transformers T1 and T2 are coupled to the opposite ends of the primary winding of transformer T3 which provides the selected frequency output signal on its secondary winding and is identified as $F_1$ REDUNDANT.

If the carrier frequency $f_1A$ is to be utilized, a negative bias voltage is applied to bias point A. Current will flow through the emitter base junction of transistor Q1 and a series circuit including resistors R1 and R2, resulting in biasing transistor Q1 on. Current will also flow through the emitter base junction of transistor Q2 and the series circuit including resistors R3 and R4 biasing transistor Q2 on. No bias voltage would be applied to bias point B. Thus, transistor Q3 will be biased off by resistor R6 and transistor Q4 will be biased off by resistor R8. A low impedance is provided by transistors Q1 and Q2 and a high impedance is provided by transistors Q3 and Q4. Thus, carrier frequency $f_1A$ applied to transformer T1 will be switched to the redundant output of transformer T3.

On the other hand, if bias voltage is applied to bias point B and no voltage is applied to bias point A, the conduction conditions of transistors Q1 and Q2 and transistors Q3 and Q4 will be reversed. Thus, carrier $f_1B$ will be switched to the redundant output of transformer T3.

The control for switch from one of the redundant carrier frequencies to the other of the redundant carrier frequencies is provided by the bias voltage at points A and B. The application of the appropriate bias voltage to bias points A and B is under control of a selecting and sensing circuit such as circuits 3 and 4 of FIG. 1. This sensing and selecting arrangement is known from the prior art and may include a carrier frequency detector (a filter tuned to the carrier frequency value involved). When no output is provided from this detector this will be detected by logic circuitry, such as NOT GATES and AND GATES, to gate through to the appropriate one of bias points A and B the appropriate bias voltage to select the desired backup carrier frequency for the equipment 6' involved.

The advantages of the distributed carrier frequencies arrangement of the present invention are:
1. If switch 10 fails only one of equipments 6' are removed from service;
2. The switch in each of equipments 6' have a lower cost and power consumption since this switch only switches a selected one of the redundant carrier frequencies to one of the equipments 6';
3. The initial cost of the arrangement of this invention with a small number of equipments 6' can be lower with reference to the cost of the prior art arrangement; and
4. The dual wires (conductors 8 and 9 of FIG. 2) to each of the equipments 6' means that a short circuit or open circuit of one of the dual wires will not cause outage of equipments 6' when the sensing takes place in the equipments 6'.

The carrier frequency selecting switch of FIG. 3 has been described hereinabove with respect to selectng either of two carrier signals having identical frequency values. However, the switch of FIG. 3 is not restricted to this operation. The switch of FIG. 3 may be employed to select either of two carrier signals having different frequency values.

The switch of FIG. 3. has also been illustrated and described hereinabove as employing pnp transistors. However, it should be noted that the switch of FIG. 3 could be implemented with npn transistors and a reversed power supply polarity and still operate to achieve the desired described function.

While I have described above the principles of my invention in connection with specific apparatus it is to be clearly understood that this description is made only by way of example and not as a limitation to the scope of my invention as set forth in the objects thereof and in the accompanying claims.

I claim:

1. A redundant carrier frequency selection arrangement for a frequency division multiplex communication system comprising:

first means to provide $n$ pairs of carrier frequencies, where $n$ is an integer including one, each carrier frequency of each pair of said $n$ pairs of carrier frequencies are equal and said carrier frequencies of each pair of said $n$ pairs of carrier frequencies are different;

$n$ plurality of second means each requiring a carrier frequency coupled to said first means and each plurality of second means of said $n$ plurality of second means responding to a different pair of said $n$ pairs of carrier frequencies; and an electronic switching means disposed in each of said $n$ plurality of second means to select either one of said carrier frequencies of an associated pair of said n pairs of carrier frequencies.

2. An arrangement according to claim 1, wherein each of said switching means includes
a first input means for one of said carrier frequencies of said associated pair of said n pairs of carrier frequencies,
a second input means for the other of said carrier frequencies of said associated pair of said n pairs of carrier frequencies,
an output means,
a first pair of normally non-conductive transistors coupled to each other, said first input means and said output means,
a second pair of normally non-conductive transistors coupled to each other, said second input means and said output means,
a first bias voltage selectively coupled to said first pair of transistors to render said first pair of transistors conductive to couple said one of said carrier frequencies of said associated pair of said n pairs of carrier frequencies to said output means, and
a second bias voltage selectively coupled to said second pair of transistors to render said second pair of transistors conductive to couple said other of said carrier frequencies of said associated pair of said n pairs of carrier frequencies to said output means.

3. An arrangement according to claim 2, wherein each transistor of said first and second pairs of transistors are pnp transistors.

4. An arrangement according to claim 3, wherein said first and second bias voltages are negative voltages.

5. An arrangement according to claim 1, wherein each of said switching means includes
a first transformer having a secondary winding and a primary winding to receive one of said carrier frequencies of said associated pair of said n pairs of carrier frequencies,
a second transformer having a secondary winding and a priamary winding to receive the other of said carrier frequencies of said associated pair of said n pairs of carrier frequencies,
a third transformer having a secondary winding and a primary winding to provide a selected one of said carrier frequencies of said associated pair of said n pairs of carrier frequencies as an output signal, said primary winding of said third transformer having one end thereof connected to one end of said secondary winding of said first transformer and the other end thereof connected to one end of said secondary winding of said second transformer,
a first normally non-conductive transistor having a collector connected to the other end of said secondary winding of said first transformer, an emitter connected to a reference potential and a base,
a first series circuit including a first resistor and a second resistor, one terminal of said second resistor being connected to said reference potential and the junction of said first and second resistors being connected to said base of said first transistor,
a second normally non-conductive transistor having a collector connected to said other end of said primary winding of said third transformer, an emitter connected to said reference potential and a base,
a second series circuit including a third resistor and a fourth resistor, one terminal of said fourth resistor being connected to said reference potential and the junction of said third and fourth resistors being connected to said base of said second transistor,
a first bias voltage selectively coupled to a terminal of said first resistor remote from the junction of said first and second resistors and to a terminal of said third resistor remote from the junction of said third and fourth resistors to render said first and second transistors conductive to couple said one of said carrier frequencies of said associated pair of said n pairs of carrier frequencies to said primary winding of said third transformer,
a third normally non-conductive transistor having a collector connected to said one end of said primary winding of said third transformer, an emitter connected to said reference potential and a base,
a third series circuit including a fifth resistor and a sixth resistor, one terminal of said sixth resistor being connected to said reference potential and the junction of said fifth and sixth resistors being connected to said base of said third transistor,
a fourth normally non-conductive transistor having a collector connected to the other end of said secondary winding of said second transformer, an emitter connected to said reference potential and a base,
a fourth series circuit including a seventh resistor and an eighth resistor, one terminal of said eighth resistor being connected to said reference potential and the junction of said seventh and eighth resistors being connected to said base of said fourth transistors, and
a second bias voltage selectively coupled to a terminal of said fifth resistor remote from the junction of said fifth and sixth resistors and to a terminal of said seventh resistor remote from the junction of said seventh and eighth resistors to render said third and fourth transistors conductive to couple said other of said carrier frequencies of said associated pair of said n pairs of carrier frequencies to said primary winding of said third transformer.

6. An arrangement according to claim 5, wherein each of said first, second, third and fourth transistors are pnp transistors, and said first and second bias voltages are negative voltages.

7. A signal selector comprising:
a first input means for a first signal having a first given frequency;
a second input means for a second signal having a second given frequency;
an output means; and
electronic switching means including
a first pair of normally non-conductive transistors coupled to each other, said first input means and said output means,
a second pair of normally non-conductive transistors coupled to each other, said second input means and said output means,
a first bias voltage selectively coupled to said first pair of transistors to render said first pair of transistors conductive to couple said first signal to said output means, and a second bias voltage selectively coupled to said second pair of transistors to render said second pair of transistors conductive to couple said second signal to said output means.

8. A selector according to claim 7, wherein said first and second given frequencies are equal.

9. A selector according to claim 7, wherein each transistor of said first and second pairs of transistors are pnp transistors.

10. A selector according to claim 8, wherein said first and second bias voltages are negative voltages.

11. A selector according to claim 10, wherein said first and second given frequencies are equal.

12. A selector according to claim 7, wherein said switching means includes a first transformer having a secondary winding and a primary winding to receive one of said first and second signals, a second transformer having a secondary winding and a primary winding to receive the other of said first and second signals, a third transformer having a secondary winding and a primary winding to provide a selected one of said first and second signals as an output signal, said primary winding of said third transformer having one end thereof connected to one end of said secondary winding of said first transformer and the other end thereof connected to one end of said secondary winding of said second transformer, a first normally non-conductive transistor having a collector connected to the other end of said secondary winding of said first transformer, an emitter connected to a reference potential and a base, a first series circuit including a first resistor and a second resistor, one terminal of said second resistor being connected to said reference potential and the junction of said first and second resistors being connected to said base of said first transistor, a second normally non-conductive transistor having a collector connected to said other end of said primary winding of said third transformer, an emitter connected to said reference potential and a base, a second series circuit including a third resistor and a fourth resistor, one terminal of said fourth resistor being connected to said reference potential and the junction of said third and fourth resistors being connected to said base of said second transistor, a first bias voltage selectively coupled to a terminal of said first resistor remote from the junction of said first and second resistors and to a terminal of said third resistor remote from the junction of said third and fourth resistors to render said first and second transistors conductive to couple said one of said first and second signals to said primary winding of said third transformer, a third normally non-conductive transistor having a collector connected to said one end of said primary winding of said third transformer, an emitter connected to said reference potential and a base, a third series circuit including a fifth resistor and a sixth resistor, one terminal of said sixth resistor being connected to said reference potential and the junction of said fifth and sixth resistors being connected to said base of said third transistor, a fourth normally non-conductive transistor having a collector connected to the other end of said secondary winding of said second transformer, an emitter connected to said reference potential and a base, a fourth series circuit including a seventh resistor and an eighth resistor, one terminal of said eighth resistor being connected to said reference potential and the junction of said seventh and eighth resistors being connected to said base of said fourth transistors, and a second bias voltage selectively coupled to a terminal of said fifth resistor remote from the junction of said fifth and sixth resistors and to a terminal of said seventh resistor remote from the junction of said seventh and eighth resistors to render said third and fourth transistors conductive to couple said other of said first and second signals to said primary winding of said third transformer.

13. A selector according to claim 12, wherein each of said first, second, third and fourth transistors are pnp transistors, and each of said first and second bias voltages are negative voltages.

14. A selector according to claim 13, wherein said first and second given frequencies are equal.

15. A selector according to claim 12, wherein said first and second given frequencies are equal.

* * * * *